(No Model.) 2 Sheets—Sheet 1.

E. MILL.
PAPER TESTING MACHINE.

No. 377,361. Patented Jan. 31, 1888.

Witnesses,
C. W. H. Brown
Frank Brauner

Inventor
Edward Mill
By Wallace A. Bartlett
Attorney.

(No Model.)  2 Sheets—Sheet 2.

E. MILL.
PAPER TESTING MACHINE.

No. 377,361. Patented Jan. 31, 1888.

Witnesses:
C. H. H. Brown,
Frank Brawner

Inventor
Edward Mill
By Wallace A. Bartlett
Attorney.

UNITED STATES PATENT OFFICE.

EDWARD MILL, OF CLEVELAND, OHIO, ASSIGNOR OF ONE-THIRD TO WILLIAM H. PATTERSON, OF SAME PLACE.

PAPER-TESTING MACHINE.

SPECIFICATION forming part of Letters Patent No. 377,361, dated January 31, 1888.

Application filed March 5, 1887. Serial No. 229,802. (No model.)

*To all whom it may concern:*

Be it known that I, EDWARD MILL, residing at Cleveland, in the county of Cuyahoga and State of Ohio, have invented certain new and useful Improvements in Paper-Testing Machines, of which the following is a specification, reference being had therein to the accompanying drawings.

This invention relates to machines for testing the strength of paper.

The invention consists in certain mechanism, substantially as hereinafter described and claimed, or the equivalent thereof, by which a pneumatic paper-testing machine is obtained; also, in certain constructions and combinations of parts by which an available machine of this class is produced.

Figure 1:
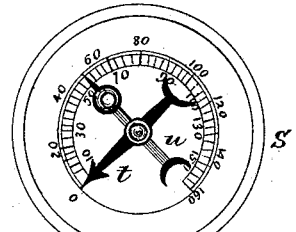
Figure 1:
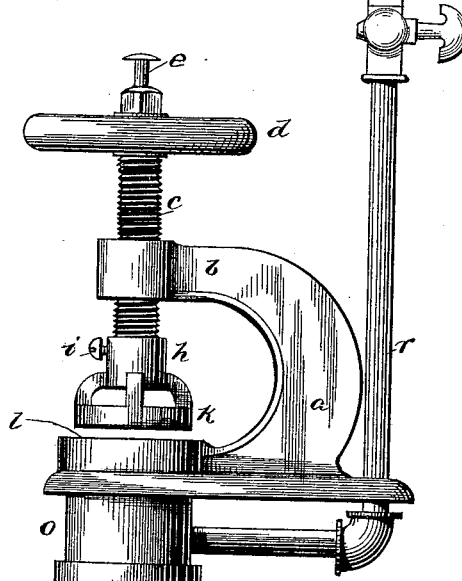
Figure 2:
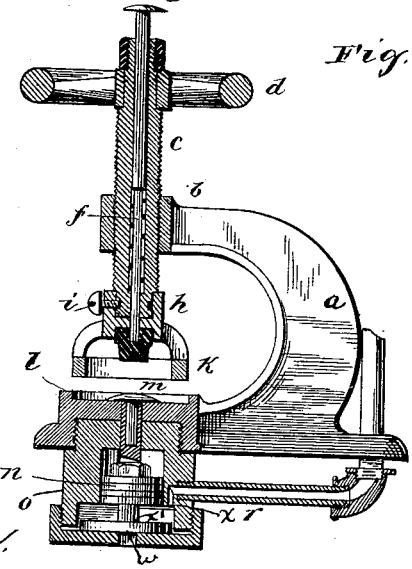
Figure 3:
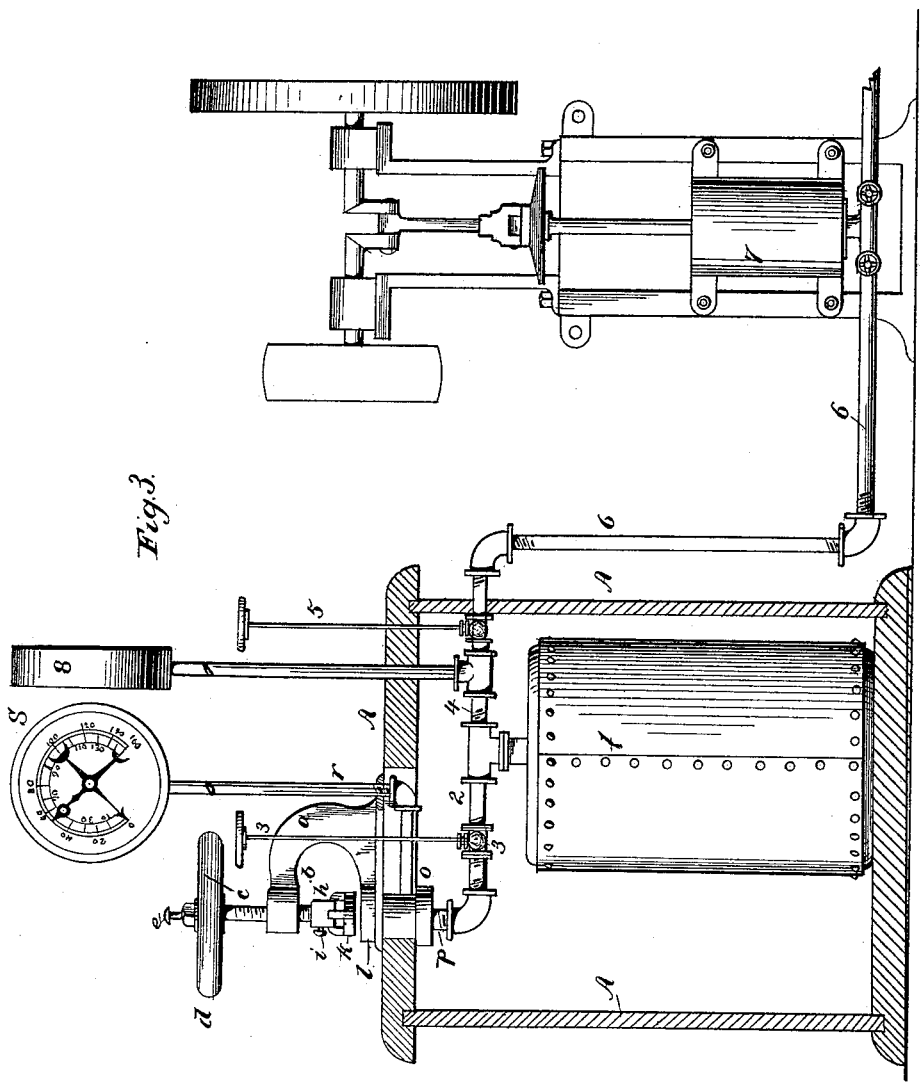

In the drawings, Figure 1 is an elevation of the upper portion of the machine to which the paper to be tested is applied. Fig. 2 is a partial section and partial elevation of the same, the gage being omitted. Fig. 3 is an elevation of the entire apparatus, the table on which the machine rests being shown in section.

The letter $a$ indicates the frame of the machine, which frame has an arm, $b$, provided with a screw-plunger, $c$, working therein. Plunger $c$ has a hand-wheel, $d$, and a central rod, $e$, which is held in elevated position by spring $f$. The plunger $c$ has a head, $h$, at its lower end, secured to the plunger by the set-screw $i$, or equivalent means, so as to be readily removable. The lower end of head $h$ has a ring, $k$, thereon. The head $h$ is removable, so as to be replaced by another head having a ring of a different size. The area within the ring is a definite number of inches or other units of measurement.

The frame $a$ has a smooth bed-plate, $l$, under ring $k$. This plate $l$ is centrally perforated for the passage of a piston-rod, $m$, which has a button at its upper end. The lower end of piston-rod $m$ has a piston, $n$, working in cylinder $o$, which cylinder is screwed or otherwise conveniently attached to the lower part of frame $a$.

A pipe, $p$, connects with a receptacle for compressed air or similar gaseous fluid, so that air can be admitted under the piston and under check-valve $w$, which check-valve is connected to the piston $n$ by rod $x'$. A pipe, $r$, leads from cylinder $o$ to the gage $s$, which gage is supplied with an indicating-hand, $t$, and a registering-hand, $u$, as is common in pressure-gages to register maximum pressure.

Beneath the table A, Fig. 3, there is preferably a storage-flask, 1, which communicates with pipe $p$ by means of a pipe, 2, and valve 3. The flask 1 may be otherwise located, and in some cases might be omitted. If the flask is used, compressed air may be forced into it through pipes 4 6, governed by valve 5. An air-pump, 7, of usual construction, will furnish compressed air to the flask 1 or to the cylinder $o$. The gage 8 serves to indicate the pressure of air in the flask 1.

In testing paper, the part of the paper to be tested is clamped between the ring $k$ and the bed-plate $l$. By opening valve 3, compressed air from flask 1, or from other source of air or gas supply, is admitted under plunger $n$, and at the same time the gage $s$ indicates the air-pressure per square inch of surface which is applied to the piston, and of course the relative pressure on the area of paper within ring $k$ may be determined from said gage. When the pressure on the piston suffices to break the paper, the piston rises freely, and the check-valve beneath it cuts off the air-pressure. The pressure indicated by the hand $t$ of the gage will immediately fall as the piston rises; but the registering-hand will remain at the highest point reached. The broken sheet of paper may now be released from the clamp, and the piston-rod $m$ be forced back by pressing down rod $e$, (a relief-valve may be applied to cylinder $o$, if needed,) the registering-hand is set back, and the machine is ready for further use.

The check-valve $w$ closes the aperture $x$, leading to the pressure-gage, as soon as the paper is broken, thus cutting off air-pressure from said gage automatically instantly on the breaking of the paper.

I claim—

1. The combination, in a paper-testing machine, of a paper-holding clamp, a piston in position to operate against the clamped paper, and mechanism by which a compressed gas may be made to actuate the piston, substantially as described.

2. The combination of the frame, a screw-plunger supported thereby and having a clamping-ring, a bed-plate beneath said ring, and a rod operating through said plunger.

3. The combination of the screw-plunger, the removable ring thereon, mechanism for retaining said ring to the plunger, and a clamping-plate beneath the ring, substantially as described.

4. The combination of the screw-plunger and its clamping-ring, the spring-rod within the plunger, the clamping-plate beneath the plunger, and a piston-rod operating through the plate.

5. The combination, with the paper-clamp and the piston operated by air-pressure, of the cylinder in which said piston works, and a pressure-gage connected to said cylinder.

6. The combination of the screw-plunger, the removable ring thereon, a clamping-plate, and a rod operating through said plate, the piston-cylinder, and a registering-gage connected with said cylinder.

7. The combination, in a paper-testing machine, of a paper-clamp, an air-actuated piston in position to work against the clamped paper, an air-storage flask connected so as to operate the piston, substantially as described, and mechanism for compressing the air, all substantially as described.

8. In a paper-testing machine, the combination of a cylinder and piston, a pressure-gage connected to said cylinder, and a valve on the piston in position to close the aperture to the pressure-gage when the piston completes its stroke, as set forth.

In testimony whereof I affix my signature in presence of two witnesses.

EDWARD MILL.

Witnesses:
WM. H. MILLER,
JOHN H. WELD.